US012619718B2

(12) United States Patent
Rodriguez Bravo et al.

(10) Patent No.: US 12,619,718 B2
(45) Date of Patent: May 5, 2026

(54) DETECTION AND PREVENTION OF LOGIN ATTACKS

(71) Applicant: Kyndryl, Inc., New York, NY (US)

(72) Inventors: Cesar Augusto Rodriguez Bravo, Alajuela (CR); Kim A. Eckert, Austin, TX (US)

(73) Assignee: Kyndryl, Inc., New York, NY (US)

( * ) Notice: Subject to any disclaimer, the term of this patent is extended or adjusted under 35 U.S.C. 154(b) by 92 days.

(21) Appl. No.: 18/604,001

(22) Filed: Mar. 13, 2024

(65) Prior Publication Data

US 2025/0291903 A1     Sep. 18, 2025

(51) Int. Cl.
G06F 21/55        (2013.01)
G06F 9/451        (2018.01)

(52) U.S. Cl.
CPC ............ G06F 21/554 (2013.01); G06F 9/451 (2018.02)

(58) Field of Classification Search
None
See application file for complete search history.

(56) References Cited

U.S. PATENT DOCUMENTS

| | | | | |
|---|---|---|---|---|
| 8,321,930 B1 * | 11/2012 | Taylor | .................. | H04L 9/3226 726/19 |
| 9,032,498 B1 * | 5/2015 | Ben Ayed | ............... | G06F 21/35 726/9 |
| 9,798,879 B2 | 10/2017 | Reddington | | |
| 10,762,432 B2 | 9/2020 | de Aguiar et al. | | |
| 11,743,119 B1 | 8/2023 | Singi et al. | | |
| 2007/0180492 A1 * | 8/2007 | Hassan | .................. | G06F 21/31 726/2 |
| 2009/0210934 A1 * | 8/2009 | Innes | ..................... | H04L 63/08 726/7 |
| 2011/0126289 A1 * | 5/2011 | Yue | ...................... | G06F 21/554 726/26 |
| 2014/0331285 A1 * | 11/2014 | Desai | .................. | H04W 12/086 726/4 |
| 2017/0090688 A1 * | 3/2017 | Anderson | ............. | G06F 3/0482 |
| 2017/0195310 A1 * | 7/2017 | Tyler | .................... | H04L 63/083 |
| 2017/0200084 A1 | 7/2017 | de Aguiar et al. | | |
| 2017/0270300 A1 | 9/2017 | Reddington | | |
| 2019/0245848 A1 * | 8/2019 | Divoux | .............. | H04L 63/0815 |

(Continued)

FOREIGN PATENT DOCUMENTS

WO      WO-2005045800 A1 *   5/2005   ............. G06T 11/20

OTHER PUBLICATIONS

Mell et al., "The NIST Definition of Cloud Computing", NIST, Special Publication 800-145, Sep. 2011, 7 pages.

(Continued)

*Primary Examiner* — Paul R Fisher
(74) *Attorney, Agent, or Firm* — Erik Swanson; Andrew D. Wright; Calderon Safran & Wright P.C.

(57) ABSTRACT

The present disclosure relates generally to cybersecurity and, more particularly, to a system and method to detect and prevent login attacks. A computer-implemented method includes: gathering, by a computing device, a login window from a display of a user device; determining, by the computing device, that the login window is invalid; flagging, by the computing device, the login window as an attack on the user device upon determining that the login window is invalid; and executing, by the computing device, a security action on the user device.

20 Claims, 5 Drawing Sheets

(56) References Cited

U.S. PATENT DOCUMENTS

| | | | | |
|---|---|---|---|---|
| 2019/0354681 | A1* | 11/2019 | Hauser | ................... G06F 21/81 |
| 2022/0124057 | A1* | 4/2022 | Kulkarni | .............. H04L 51/214 |
| 2022/0342982 | A1 | 10/2022 | Huseynov et al. | |
| 2023/0185608 | A1 | 6/2023 | Poort et al. | |

OTHER PUBLICATIONS

A. Solairaj et al., "Keyloggers Software Detection Techniques", 2016 10th International Conference on Intelligent Systems and Control (ISCO), Coimbatore, India, 2016, pp. 1-6, doi: 10.1109/ISCO.2016.7726880, 6 pages.
Unknown, "Advance Security Solutions for the Latest Fake Windows Lock Screen Hacks", IP.com, IP.com No. IPCOM000271744D, Published Feb. 6, 2023, 3 pages.
Unknown, "Cloud Service Selection and Placement Service Manager", IP.com, IP.com No. IPCOM000270376D, Published Jul. 1, 2022, 6 pages.
Unknown, "How to Prevent Keylogger Threats", Microsoft 365, https://www.microsoft.com/en-us/microsoft-365-life-hacks/privacy-and-safety/what-is-a-keylogger, Jul. 12, 2022, 7 pages.
Gavin Phillips, "5 Ways to Protect Yourself Against Keyloggers", Make Use Of, https://www.makeuseof.com/tag/4-ways-protect-keyloggers/, Published Jul. 31, 2018, 10 pages.
Yohanes Aristianto, "KL-Detector v1.3—Free keylogger detection for your Windows system!", http://dewasoft.com/privacy/kldetector.htm, downloaded Mar. 13, 2024, 5 pages.
Uknown, "Fake Windows Login Screen", https://www.youtube.com/watch?v=FmnKKE604y4, accessed Mar. 13, 2024, 3 pages.

* cited by examiner

500

505

510

515

520

DETECTION AND PREVENTION OF LOGIN ATTACKS

BACKGROUND

Aspects of the present invention relate generally to cyber-security and, more particularly, to a system and method to detect and prevent login attacks.

Computer attacks may take on many different forms including, for example, a keystroke attack (also known as keylogging attacks). There are several types of keylogging attacks. These attacks may include, for example, key sniffing, hardware-based attacks and software keylogging attacks.

SUMMARY

In a first aspect of the invention, there is a computer-implemented method including: gathering, by a computing device, a login window from a display of a user device; determining, by the computing device, that the login window is invalid; flagging, by the computing device, the login window as an attack on the user device upon determining that the login window is invalid; and executing, by the computing device, a security action on the user device.

In another aspect of the invention, there is a computer program product including one or more computer readable storage media having program instructions collectively stored on the one or more computer readable storage media. The program instructions are executable to: detect a login window on a display of a user device, the detecting comprising gathering images from an operating systems graphics architecture using an internal API; determine that the login window is invalid by matching the login window to sample login windows of the user device known to be real login windows; flag the login window as an attack on the user device upon determining that the login window does not match to any of the sample login windows; and execute a security action on the user device when there is no match.

In another aspect of the invention, there is system including a processor, a computer readable memory, one or more computer readable storage media, and program instructions collectively stored on the one or more computer readable storage media. The program instructions are executable to: gather a login window from a display of a user device; flag the login window as an attack on the user device upon determining that the login window is invalid; and execute a security action on the user device when the login window is flagged as invalid.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
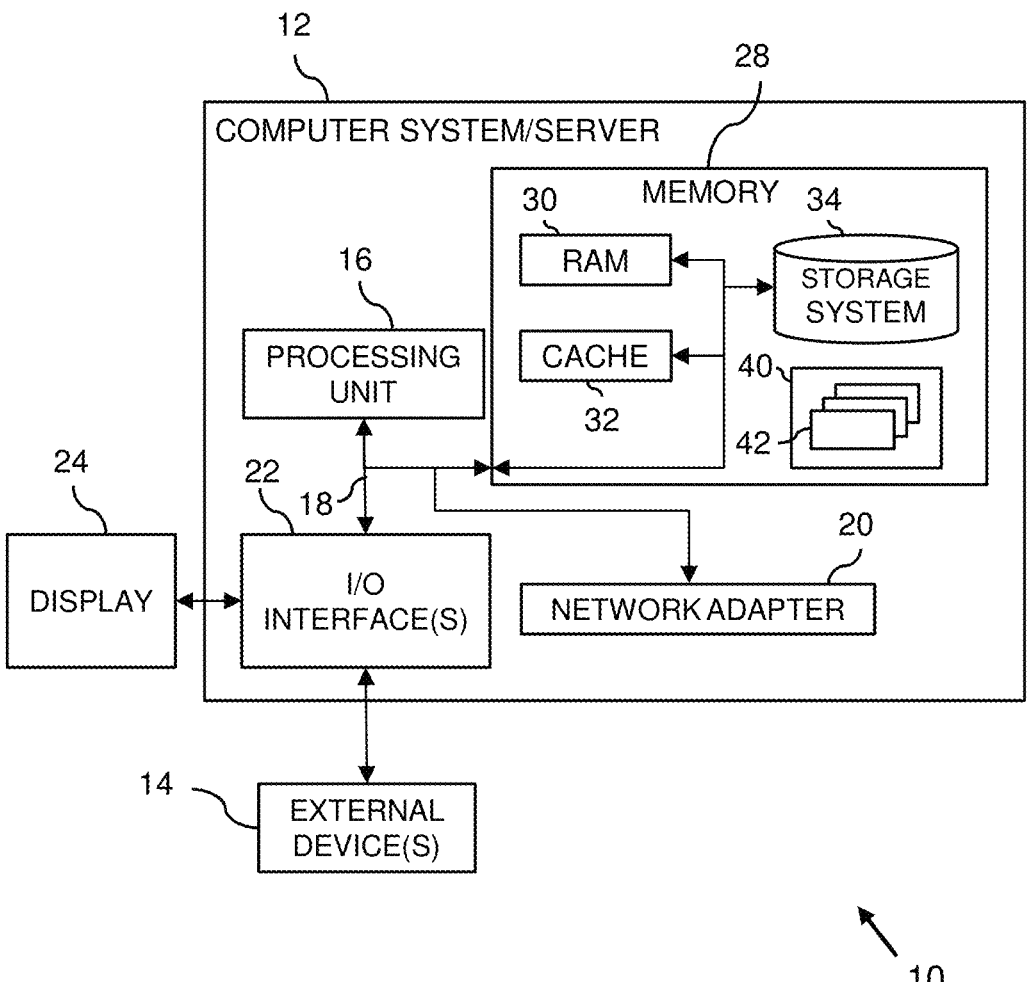
FIG. 1 depicts a cloud computing node according to an embodiment of the present invention.

Aspects of the present invention relate generally to cyber-security and, more particularly, to a system and method to detect and prevent login attacks. More specifically, aspects of the invention are directed to a system and method to detect and protect against fake windows login attacks. For example, the system and method will detect fake login windows which, in turn, will protect against a user inputting their password or other login information into a fake login page. In this way, aspects of the present invention ensure password or passcode or other login information will not be sent to an attacker (e.g., hacker), which could otherwise be obtained by an attacker when a user password has been entered into a fake login page. The system and/or method can be implemented as a computer program product.

The system, method and computer program product provide a technical feature (e.g., technical solution) to a technical problem of detecting and thwarting malicious activity on a computing device, e.g., keylogging attacks and more fake windows login attacks. The system, method, and computer program product, for example, also integrate a practical and significant application to detect and prevent fake windows login attacks.

By way of example, the system, method and computer program use a plurality of techniques to determine if a login screen is displayed on the user screen. These techniques may include, for example, screencast technologies, and gathering images from an operating system graphics architecture using, for example, internal APIs. The system, method and computer program further gather system calls and parameters from the operating system to determine if the device is in a locked state and, if so, the system, method and computer program determine if the user is being attacked by correlating the results of the above gathered and analyzed information as described in more detail herein.

Should the device be under attack, e.g., it is found that a fake login screen is being displayed to the user, the system, method and computer program execute security actions to protect the user against an attack based on a security profile of the user. These security actions may be, for example, sending and/or displaying appropriate notifications, execution of a Ctrl+Alt+Del command as a windows security screen, deleting of non-essential processes, e.g., delete fake windows process and/or executing a notification or alert window with an "on-top" property. Accordingly, it is possible to thwart an attack and prevent a user password from being obtained by a hacker to access a user's computer device or other accounts. Also, advantageously, the system, method, and computer program product detect a security threat in real-time, which leads to added security and reduced fraudulent activity.

To the extent implementations of the invention collect, store, or employ personal information provided by, or obtained from, individuals (for example, passwords and usernames) such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
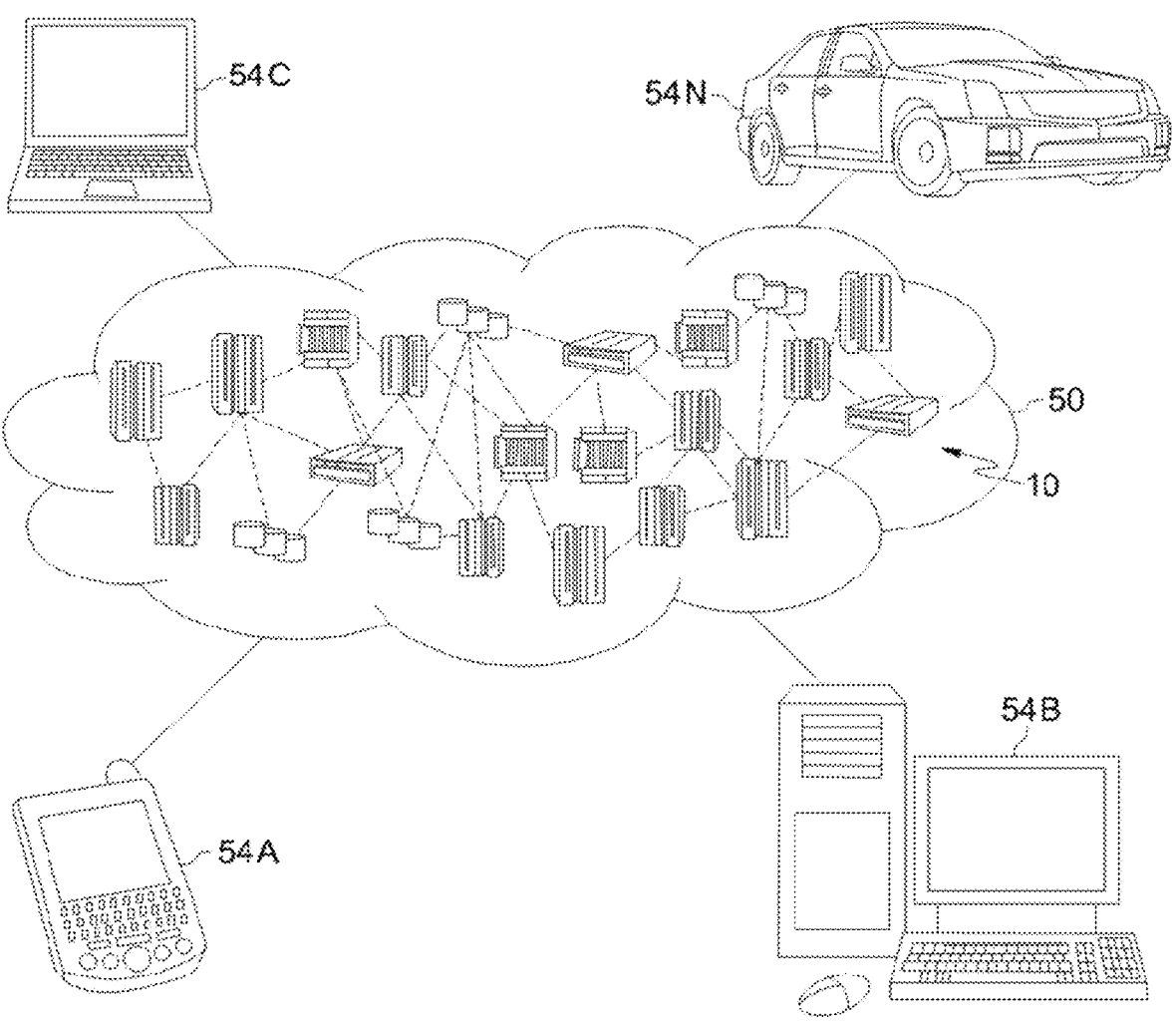
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
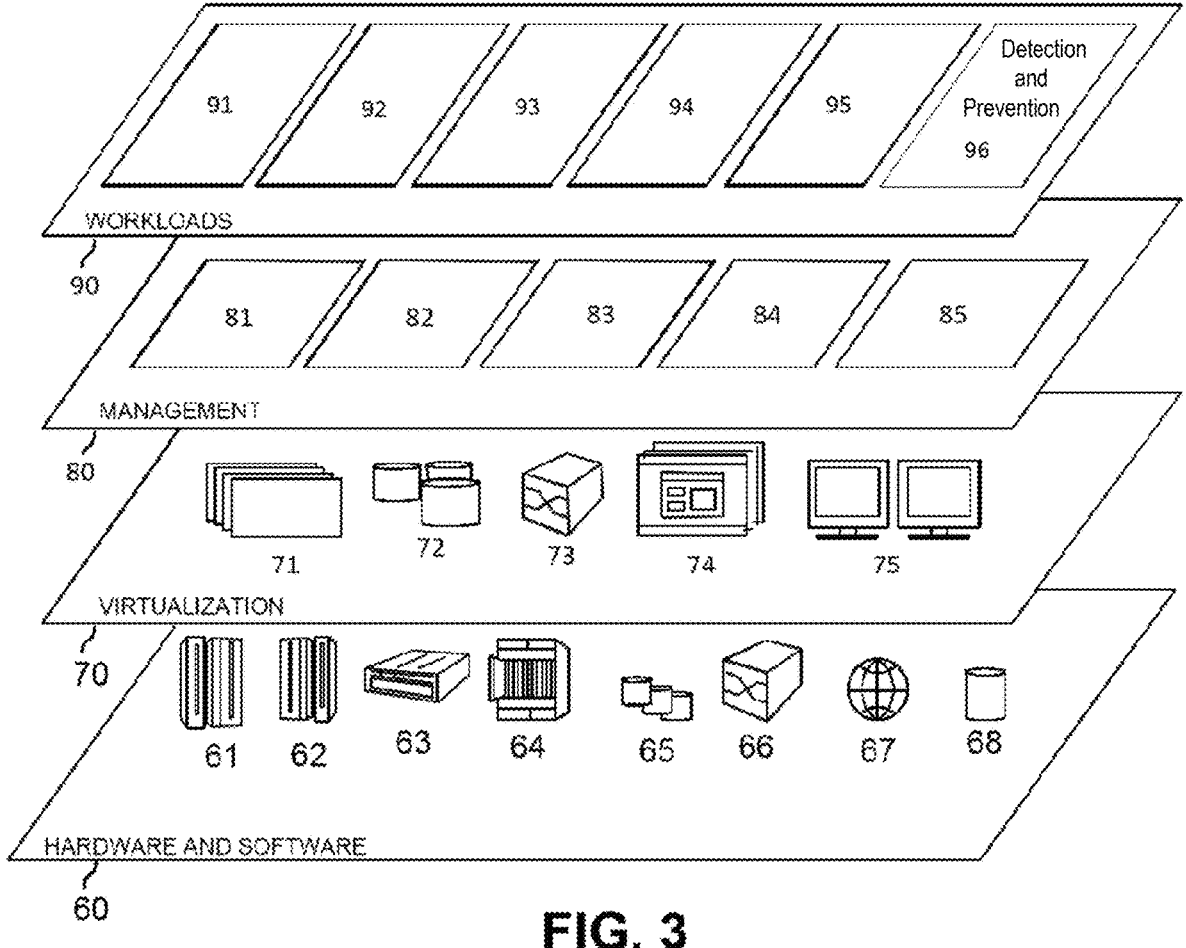
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and detection and prevention 96.

Implementations of the invention may include a computer system/server 12 of FIG. 1 in which one or more of the program modules 42 are configured to perform (or cause the computer system/server 12 to perform) one of more functions of the detection and prevention 96 of FIG. 3. For example, the one or more of the program modules 42 may be configured to detect a fake login screen or window of a user's account or computing device. In embodiments, the user's account can be any application, e.g., web application, password secured document, etc. The fake login screen can be detected by leveraging different windows calls and parameters, as a few examples.

More specifically, and in embodiments of the invention, the program modules 42 use screencast technologies to gather snapshots of a current screen displayed on a user's device. These snapshots will be analyzed using image recognition to determine if the screen is a window lock screen or other window log in screen, for example. The program modules 42 gather images from the operating systems graphics architecture using an internal API. For example, images can be gathered from GDI, GDI+, DirectWrite, etc. architectures. The program modules 42 will analyze the gathered images to determine if any of the gathered images matches patterns of, for example, a windows lock screen for the computing device or application running on the computing device.

In additional embodiments, upon confirmation of an attack (e.g., a fake windows lock screen is detected), the program modules 42 can execute security actions. For example, the program modules 42 will send a notification of the attack to a predetermined, authorized personnel. The personnel can be, for example, a member of an IT team, security team, etc. The security action may be, for example, executing an Ctrl+Alt+Del command. In this security action, only the operating kernel can detect whether the Ctrl+Alt+Del command has been pressed. Accordingly, this command cannot be intercepted by third party programs, e.g., hackers. So, in such an execution scenario, the Ctrl+Alt+Del command will act as the windows security screen by displaying the Ctrl+Alt+Del command page over the fake login window. In this way, a user will be notified that the computer was not locked and is, instead, under attack.

Another contemplated security action is to delete non-essential processes including, e.g., the fake window login screen processes. In a further security action, the program modules 42 may execute an "On-top-notification". For example, depending on the user security profile, the program modules 42 can execute a notification window with an "on-top" property to ensure the window will be displayed over the fake login window, e.g., fake lock window. This notification window can contain an alert to the user about the fake attack and further instructions to stop the attack.

It should be understood that the program modules and, particularly, program modules 42 of FIG. 3 may be implemented in the exemplary environment of FIGS. 1 and 2. In embodiments, the program modules 42 may be separate modules or may be integrated into a single module. Additionally, or alternatively, a single module may be implemented as multiple modules. Moreover, the environment may include devices and/or networks; fewer devices and/or networks; different devices and/or networks; or differently arranged devices and/or networks than illustrated in FIGS. 1 and 2.

Figure 4:
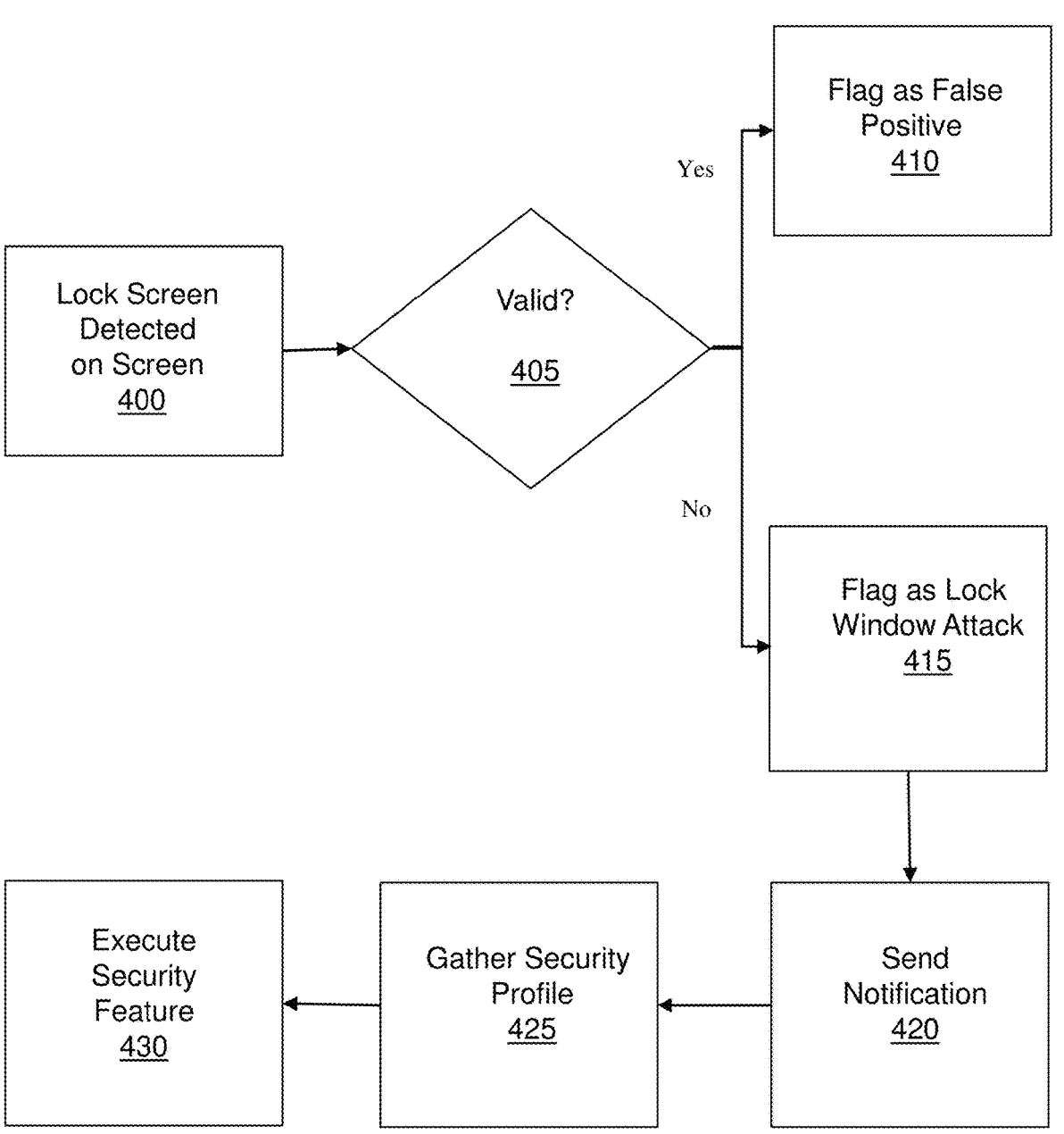
FIG. 4 shows a flowchart of an exemplary method in accordance with aspects of the invention.

FIG. 4 shows a flowchart of an exemplary method in accordance with aspects of the present invention. Steps of the method may be carried out in the environments of FIGS. 1, 2 and/or 3.

Figure 5:
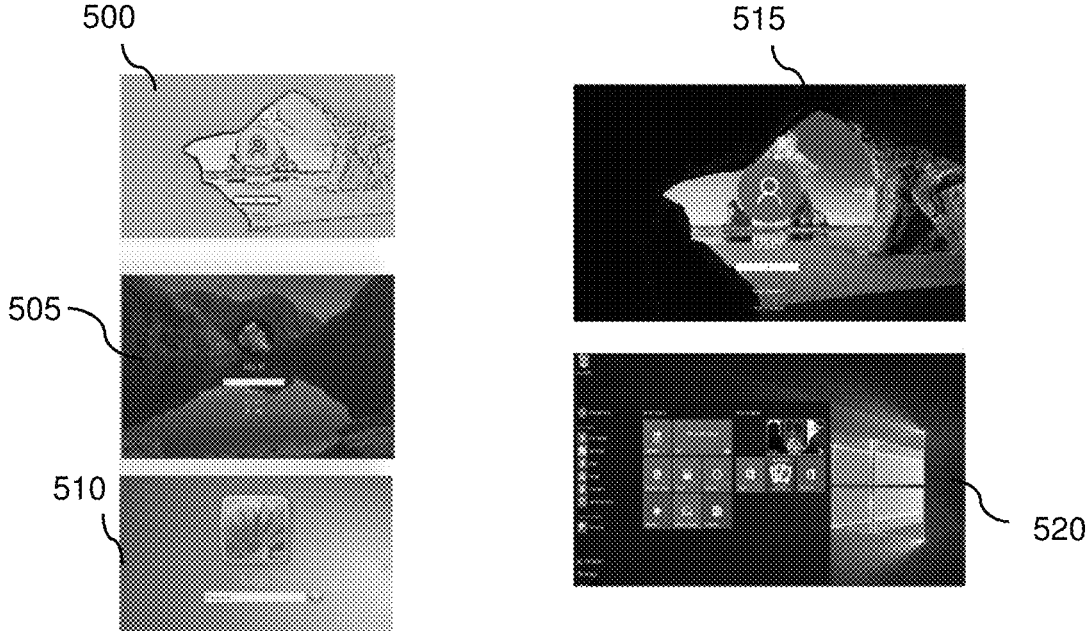
FIG. 5 shows an example use of screencast technologies and matching operations in accordance with aspects of the present invention.

At step 400, the system detects a lock screen. As is understood by one of ordinary skill in the art, the lock screen is a feature that appears on a computing computer when it is inactive for a certain amount of time. The lock screen will block any access to the desktop (device) until a certain security measure has been completed to gain access, such as entering a password or passcode, identifying patterns on an image, or using biometric authentication, as examples. The lock screen can be detected by, for example, gathering images from the operating systems graphics architecture using an internal API, e.g., GDI, GDI+, DirectWrite, etc. architectures and/or using a screencast method which captures the login screen of a lock window and matches it to known sample login images, as shown in FIG. 5.

At step 405, the system will validate a lock screen by taking one or more combination of validation actions. For example, the system will monitor logs to detect when Event ID 4800 is created. This event is generated every time a computer is manually or automatically locked. If a lock screen is detected and Event ID 4800 is created, the process will continue to step 410. Alternatively, or in addition to the above validation actions, the system can query to a logonui process. For example, if a device is locked, the system will create a process called logonui. For example, the system executes a query to confirm the computer is in a locked state. This query may be, for example, System.Diagnostics.Process.GetProcessesByName ("logonui"). Alternatively, or in addition to the above actions, the system will execute an API call to determine if the system is currently locked, e.g., WM_WTSSESSION_CHANGE Parameter: WTS_SESSION_LOCK (0x7).

The process proceeds to step 410 when it is determined that the lock state is a valid state as determined in step 405 by any combination of the validation methods described herein. At step 410, for example, a false positive flag is created indicating that no further action is necessary as the lock state is valid. Alternatively, the process proceeds to step 415 when it is determined that the lock state is not valid, e.g., an attack is occurring. At step 415, the system flags the windows lock as an attack.

At step 420, the system sends a notification of the attack to a predetermined, authorized person. The authorized person may be an IT or security team member as some examples. At step 425, the system will gather a security profile of the user. This will allow the system to determine which is the appropriate action to remediate the attack as provided at step 430.

The remediation at step 430 may take the form of any combination of the following security actions. For example, a security feature may be to execute a Ctrl+Alt+Del command. As already disclosed herein, only the operating system kernel can detect whether the Ctrl+Alt+Del command has been pressed, hence it cannot be intercepted by third party programs. In this way, when the Ctrl+Alt+Del command is executed, the Ctrl+Alt+Del command screen can be displayed as the windows security screen (the page displayed by windows when the sequence is detected), which is placed on top of any software running. This will provide notification to the user that an attack, e.g., the computer was not locked and a fake login screen is being displayed.

Still referring to step 430, another security action is to delete all non-essential processes. For example, a non-essential process is the fake log-in window or lock screen. This will ensure any fake log-in windows or lock screen are deleted. Still another security action is executing a notification window with an "on-top" property to ensure the window will be displayed over the fake log-in window or lock screen. This on top window will contain an alert to the user about the fake lock attack and some further instructions to stop the attack.

FIG. 5 shows an example use of screencast technologies and matching operations in accordance with aspects of the present invention. As shown in FIG. 5, samples of window lock screens or other real login screens are shown at reference numerals 500, 505, 510. These samples 500, 505, 510 are real screens which are saved in a database including, for example, the storage system 34 shown in FIG. 1. In embodiments, these sample screens 500, 505, 510 represent real window lock screens or other real window login screens for when the user's computing device or different applications used by the user have been locked due to, for example, when the computing device and/or application has been inactive for a certain amount of time. The applications may be, for example, web-based applications which are accessible by the user. On the other hand, screen images 515, 520 are snapshots of a current screen displayed on a user's device. The snapshots can be gathered by screencast technologies. The system and method can also gather images from the operating systems graphics architecture using an internal API, i.e., GDI, GDI+, DirectWrite, etc. architectures.

As already described herein, aspects of the invention will analyze the screen images 515, 520 to determine if any of the gathered images match patterns of, for example, a windows lock screen 500, 515, 510. In this case, the sample image 505 matches the screen image 515. Accordingly, the screen image 515 would be considered valid and no security action would be required, e.g., false positive flag provided at step 410 of FIG. 4. On the other hand, none of the sample screens 500, 515, 510 match screen image 520. In this case, aspects of the invention would flag the screen image 520 as a window lock attack (see, e.g., step 415 of FIG. 4) and security actions would be required, e.g., following steps 420-430 of FIG. 4.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
gathering, by a computing device, a lock screen corresponding to a login from a display of a user device;
determining, by the computing device, that the lock screen is invalid;
flagging, by the computing device, the lock screen as an attack on the user device upon determining that the lock screen is invalid; and
executing, by the computing device, a security action comprising deleting the lock screen on the user device, wherein the determining that the lock screen is invalid comprises:
querying logs of the user device to detect whether a predetermined event identification has been created which indicates that the user device is in the lock screen; and
determining that the lock screen is invalid in response to detecting that the querying logs are devoid of the predetermined event identification.

2. The method of claim 1, wherein the determining that the lock screen is invalid comprises matching the gathered lock screen to one or more sample valid lock screens and upon determining that a match does not exist, flagging the lock screen as invalid.

3. The method of claim 1, wherein the gathering comprises obtaining a screenshot of the display using a screencasting process.

4. The method of claim 1, wherein the gathering comprises gathering images from an operating systems graphics architecture using an internal API.

5. The method of claim 1, wherein the determining the lock screen is invalid further comprises:
querying a logonui process to determine whether the user device is in the lock screen; and
determining that the lock screen is invalid in response to detecting that the querying logs are devoid of the logonui process.

6. The method of claim 1, wherein the determining the lock screen is invalid further comprises:
executing an API call by detecting a windows session change to determine whether the user device is in the lock screen; and
determining that the lock screen is invalid in response to not detecting the windows session change.

7. The method of claim 1, wherein the security action further comprises providing a notification that the lock screen is invalid.

8. The method of claim 1, further comprising gathering a security profile of the user when the lock screen is determined to be invalid, the security profile comprising security actions to take on the user device.

9. The method of claim 1, wherein the security action further comprises executing a Ctrl+Alt+Del command which displays a Ctrl+Alt+Del command screen on top of any software running on the user device.

10. The method of claim 1, wherein the security action further comprises deleting non-essential processes.

11. The method of claim 1, wherein the security action further comprises executing a notification window with an on-top property.

12. The method of claim 1, wherein the computing device includes software provided as a service in a cloud environment.

13. The method of claim 1, wherein the predetermined event identification comprises an event identification 4800.

14. The method of claim 13, further comprising executing a system diagnostic process query to determine that the user device is in the lock screen and that the lock screen is invalid.

15. A computer program product comprising one or more computer readable storage media having program instructions collectively stored on the one or more computer readable storage media, the program instructions executable to:

> detect a lock screen on a display of a user device, the detecting comprising gathering images from an operating systems graphics architecture using an internal API;
>
> flag the lock screen as an attack on the user device upon determining that the lock screen is invalid; and
>
> execute a security action comprising executing a Ctrl+ Alt+Del command which displays a Ctrl+Alt+Del command screen on top of any software running on the user device when the lock screen is flagged as invalid,
>
> wherein the determining the lock screen is invalid comprises:
>
>> querying a logonui process of the user device to determine whether the user device is in the lock screen; and
>>
>> determining that the lock screen is invalid in response to detecting that the querying logs are devoid of the logonui process.

16. The computer program product of claim 15, wherein the security action further comprises:

> deleting non-essential processes;
>
> executing a notification window with an on-top property; and
>
> deleting the lock screen on the user device.

17. The computer program product of claim 15, wherein the determining further comprises matching the lock screen to sample lock screens of the user device known to be real lock screens.

18. The computer program product of claim 15, wherein the determining further comprises:

> querying logs of the user device to detect whether a predetermined event identification has been created which indicates that the user device is in the lock screen; and
>
> determining that the lock screen is invalid in response to detecting that the querying logs are devoid of the predetermined event identification.

19. The computer program product of claim 15, wherein the determining further comprises:

> executing an API call by detecting a windows session change to determine whether the user device is in the lock screen; and
>
> determining that the lock screen is invalid in response to not detecting the window session change.

20. A system comprising:

> a processor, a computer readable memory, one or more computer readable storage media, and program instructions collectively stored on the one or more computer readable storage media, the program instructions executable to:
>
> gather a lock screen from a display of a user device;
>
> determine that the lock screen is invalid by executing a login process; and
>
> execute a security action on the user device, wherein the security action prevents a user from entering a password into the lock screen by performing one or more of deleting the lock screen on the user device, executing a Ctrl+Alt+Del command which displays a Ctrl+Alt+ Del command screen on top of any software running on the user device, or deleting non-essential processes;
>
> wherein the determining the lock screen is invalid comprises:
>
> executing an API call by detecting a windows session change to determine whether the user device is in the lock screen; and
>
> determining that the lock screen is invalid in response to not detecting the window session change.

* * * * *